(12) United States Patent
Hetherington et al.

(10) Patent No.: US 8,036,879 B2
(45) Date of Patent: Oct. 11, 2011

(54) FAST ACOUSTIC CANCELLATION

(75) Inventors: Phillip A. Hetherington, Port Moody (CA); Shreyas A. Paranjpe, Vancouver (CA)

(73) Assignee: QNX Software Systems Co., Ottawa, Ontario (CA)

( * ) Notice: Subject to any disclaimer, the term of this patent is extended or adjusted under 35 U.S.C. 154(b) by 1104 days.

(21) Appl. No.: 11/771,258

(22) Filed: Jun. 29, 2007

(65) Prior Publication Data

US 2008/0281584 A1 Nov. 13, 2008

Related U.S. Application Data

(60) Provisional application No. 60/916,493, filed on May 7, 2007.

(51) Int. Cl.
*G10L 11/00* (2006.01)

(52) U.S. Cl. .................................................. 704/200
(58) Field of Classification Search .................. 704/200
See application file for complete search history.

(56) References Cited

U.S. PATENT DOCUMENTS

| | | | | |
|---|---|---|---|---|
| 6,167,133 A * | 12/2000 | Caceres et al. | ........... | 379/406.13 |
| 6,266,633 B1 * | 7/2001 | Higgins et al. | ................ | 704/224 |
| 2005/0186933 A1 * | 8/2005 | Trans | ............................ | 455/296 |
| 2006/0287830 A1 * | 12/2006 | Tang | ............................... | 702/13 |
| 2007/0036345 A1 * | 2/2007 | Usman et al. | ........... | 379/406.08 |
| 2007/0280472 A1 * | 12/2007 | Stokes, III et al. | ........ | 379/406.01 |

\* cited by examiner

*Primary Examiner* — Jakieda Jackson
(74) *Attorney, Agent, or Firm* — Brinks Hofer Gilson & Lione

(57) ABSTRACT

A speech enhancement system improves the perceptual quality of an aural signal. A receiver detects and receives an unvoiced signal, a fully voiced signal, or a mixed voice remote signal. A coherence processor identifies the similarities or differences between a local signal and the remote signal. A cancellation processor or controller dampens reflected signals that may be part of the local signal.

25 Claims, 10 Drawing Sheets

FAST ACOUSTIC CANCELLATION

PRIORITY CLAIM

This application claims the benefit of priority from U.S. Provisional Application No. 60/916,493, filed May 7, 2007, which is incorporated by reference.

BACKGROUND OF THE INVENTION

1. Technical Field

This application relates to sound reflection and more particularly to a system that attenuates or dampens reflected sound.

2. Related Art

Sound cancellation may require significant computational and memory resources. When integrated with navigation, voice recognition, or music playback technology, sound cancellation may consume so many resources that other features may not operate simultaneously. The high computational and memory requirements of this technology may prevent some sound cancellation systems from running on lower cost processors that support other technology.

Sound cancellation may operate in different environments. Some systems support conversations in which there are states when only a remote speaker is talking, only a local speaker is talking, a remote and a local speaker are talking, or neither are talking. During these states minor sounds such as breaths, clicks, or road bumps may be heard that blur the boundaries between these states. Besides these differences, acoustic paths of some systems change, as the local speaker shifts positions, changes posture, or operates different controls such as a brake, accelerator, clutch pedal, or steering wheel in a vehicle. The changing environments make it difficult to suppress reflected sound that may be heard. Therefore, there is a need for a scalable system that may adapt to changing environments while minimizing resource requirements.

SUMMARY

A speech enhancement system improves the perceptual quality of an aural signal. A receiver detects a remote signal and a coherence processor identifies the similarities or differences between a local signal and the remote signal. A cancellation processor dampens the remote signal's reflections from the local signal using commands received from the coherence processor.

Other systems, methods, features, and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views and dashed lines indicate optional elements or acts.

DETAILED DESCRIPTION OF THE PREFERRED EMBODIMENTS

A speech enhancement system may improve the perceptual quality of an aural signal. The system may automatically estimate the likelihood of a reflected speech signal in real time or delayed time. By tracking a relative magnitude and phase difference between multiple signals, some systems eliminate or dampen the reflected speech signal using limited resources. The systems eliminate or dampen a reflected speech signal through time-varying gain element(s) that directly condition a signal; an alternative system may use a spectral subtractor. A spectral subtraction may eliminate or dampen reflected speech signals and residual reflections through a common or single act or through a single component.

Figure 1:
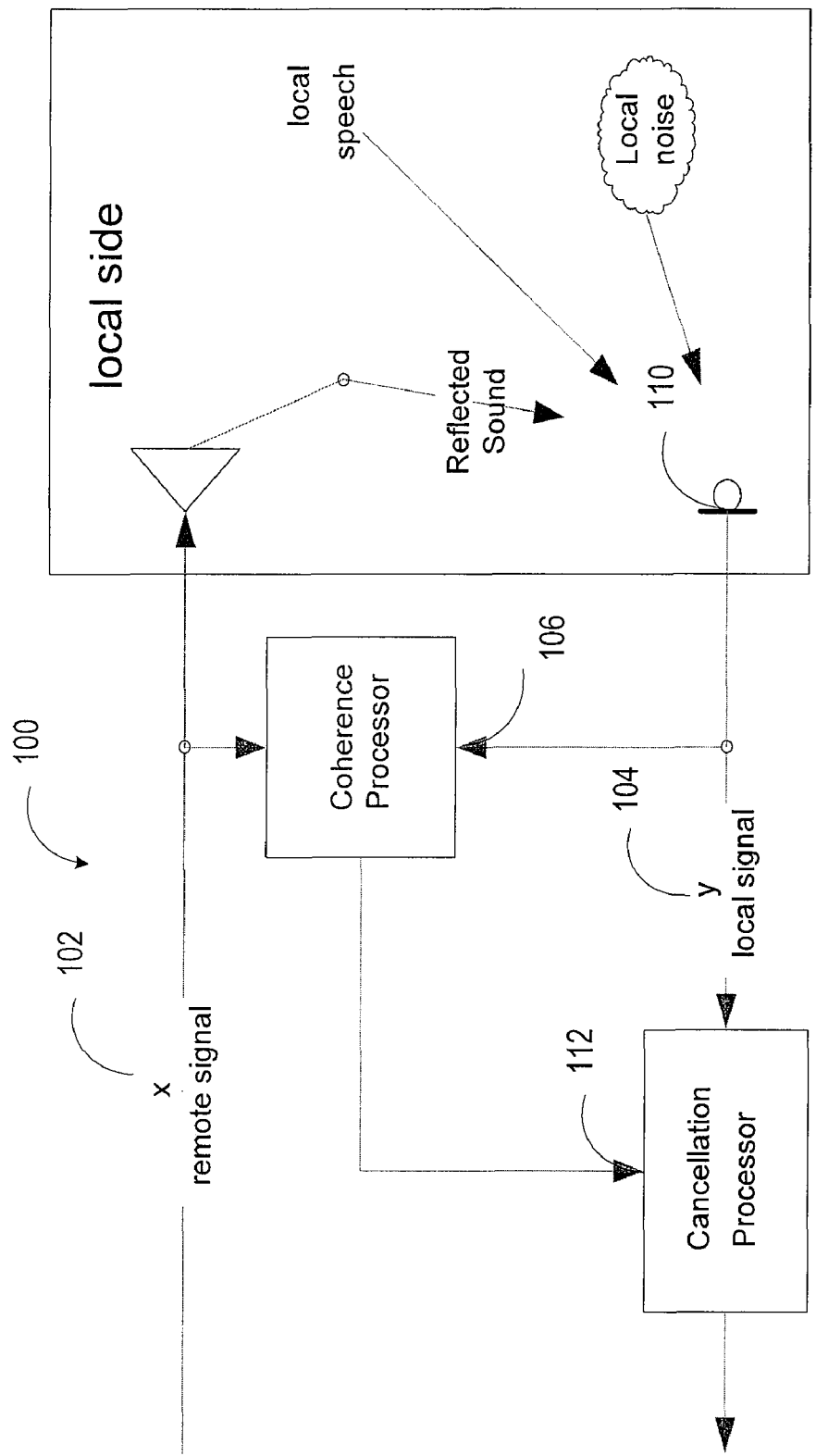
FIG. 1 is a block diagram of a speech enhancement system.

FIG. 1 is a block diagram of a speech enhancement system 100. While some of the speech enhancement systems 100 receive many input channels that convey remote signals (e.g., through an audio bus and interface that supports multiple audio sources), the speech enhancement system 100 of FIG. 1 is shown with a common input channel. The remote channel conveys a remote analog or digital input 102 that is converted into an aural signal (e.g., a loudspeaker) and processed by a coherence processor 106. The coherence processor 106 may receive or detect an unvoiced, a fully voiced, or a mixed voice remote signal (x) 102 and a local signal (y) 104 through a receiver.

A coherence processor 106 identifies the similarities and/or differences between the remote signal and local signal. A local speech signal and environmental noise may be detected and/or received by a device that converts sound into continuously varying signals or digital data. When portions of the remote signal 102 and local signal 104 are similar, the coherence processor 106 issues a command that instructs the cancellation processor 112 to minimize or dampen a reflected sound that may be part of the local signal 104. When portions of the remote signal 102 and the local signal 104 are not similar, the coherence processor 106 issues a command to the cancellation processor 112 to pass the local signal. When the remote signal 102 and local signal 104 are somewhat similar, some coherence processors 106 issue a command that instructs the cancellation processor 112 to minimize or dampen the reflected sound that may be part of the local signal 104. In some alternative systems or applications, a coherence processor 112 may issue a command to the cancellation processor 112 that passes the local signal 104 with minimal attenuation when the remote signal 102 and the local signal 104 are somewhat similar.

Figure 2:
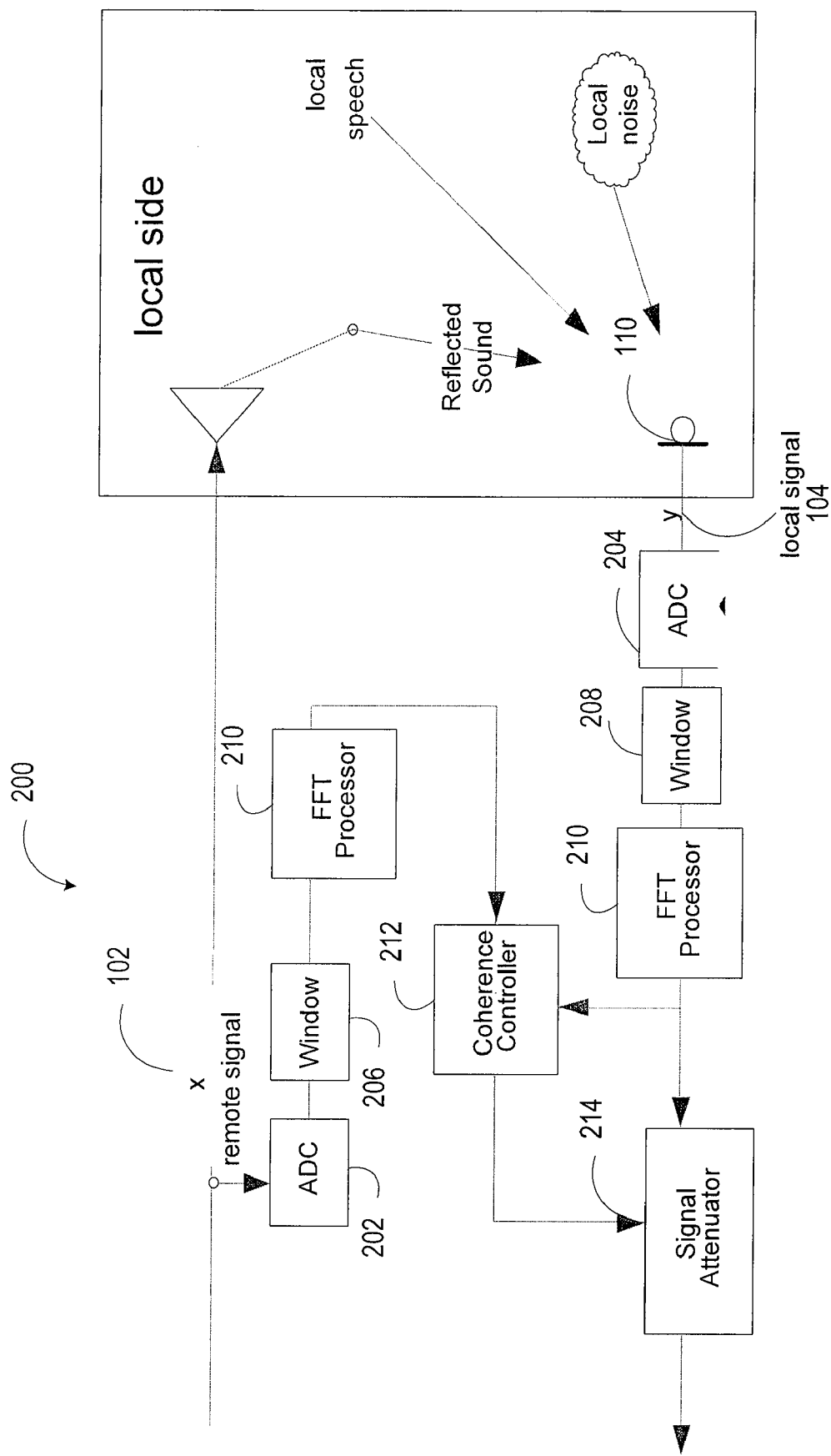
FIG. 2 is a block diagram of a second alternative speech enhancement system.

FIG. 2 is a block diagram of an alternative system 200 that includes a coherence system and signal attenuator 214 that may process a remote and local signal received through one or more receivers or interfaces. At each input, the received or detected signal is digitized at a predetermined frequency if it is received in an analog format. To assure good quality speech (band limited to about 300 to about 3,400 Hz), time varying speech signals are converted to a pulse-code-modulated (PCM) signal by an analog-to-digital converter (ADC) 202 and 204 having a predetermined sampling rate, such as about 8 kHz. A smooth window 206 and 208, such as a Hanning window (e.g., 256-point Hanning window), may provide an accurate estimation of speech. The complex spectrum for the windowed signals may be obtained by a filter bank or Fast Fourier Transform (FFT) processor 210 that separates the digitized signals into frequency bins, with each bin identifying a magnitude and phase across a frequency range. The relative magnitude and phase differences between the remote signal 102 and local signal 104 are compared for some or each of the corresponding frequency bins to estimate or derive a single or multiple coherence values. If the relative magnitude and phase differences of the corresponding frequency bins of the remote signal 102 and local signal 104 are approximately the same or constant (hardware or software may account or compensate for local environmental noise differences), the coherence will be positive and may lie in a positive range having an upper limit near 1. If the relative magnitude and phase differences of the corresponding frequency bins of the remote signal 102 and local signal 104 are constantly changing, the coherence may approach a range having a lower limit near 0.

Based on the coherence value, a coherence controller 212 may send a control signal to the signal attenuator 214. If the coherence lies in an upper range, the coherence controller 212 may direct the signal attenuator 214 to attenuate the reflected speech signal received from a local source. If the coherence value lies in a lower range, the coherence controller 212 may direct the signal attenuator 214 to pass the local signal 104. When coherence values lie outside of an upper range and a lower range, the coherence controller 212 may be programmed to pass the local signal 104 or partially attenuate the local signal 104 to attain a desired perceptual quality.

The alternative coherence system and signal attenuator 214 of FIG. 2 may operate in stateless conditions. In some systems, operation need not be conditioned on a given state (such as "a double talk state" or "a room response change state," etc.). The coherence system and signal attenuator 214 may apply fuzzy, soft, or continuous thresholds. The use of soft threshold ranges that apply possibly non-linear attenuation functions to the undesired reflections of the remote signal may minimize abrupt or annoying sound. By not forcing the coherence system and the signal attenuator 214 to operate with respect to specific states, the speech enhancement system 200 minimizes erratic operation that may arise when some or all of the states are misclassified.

Figure 3:
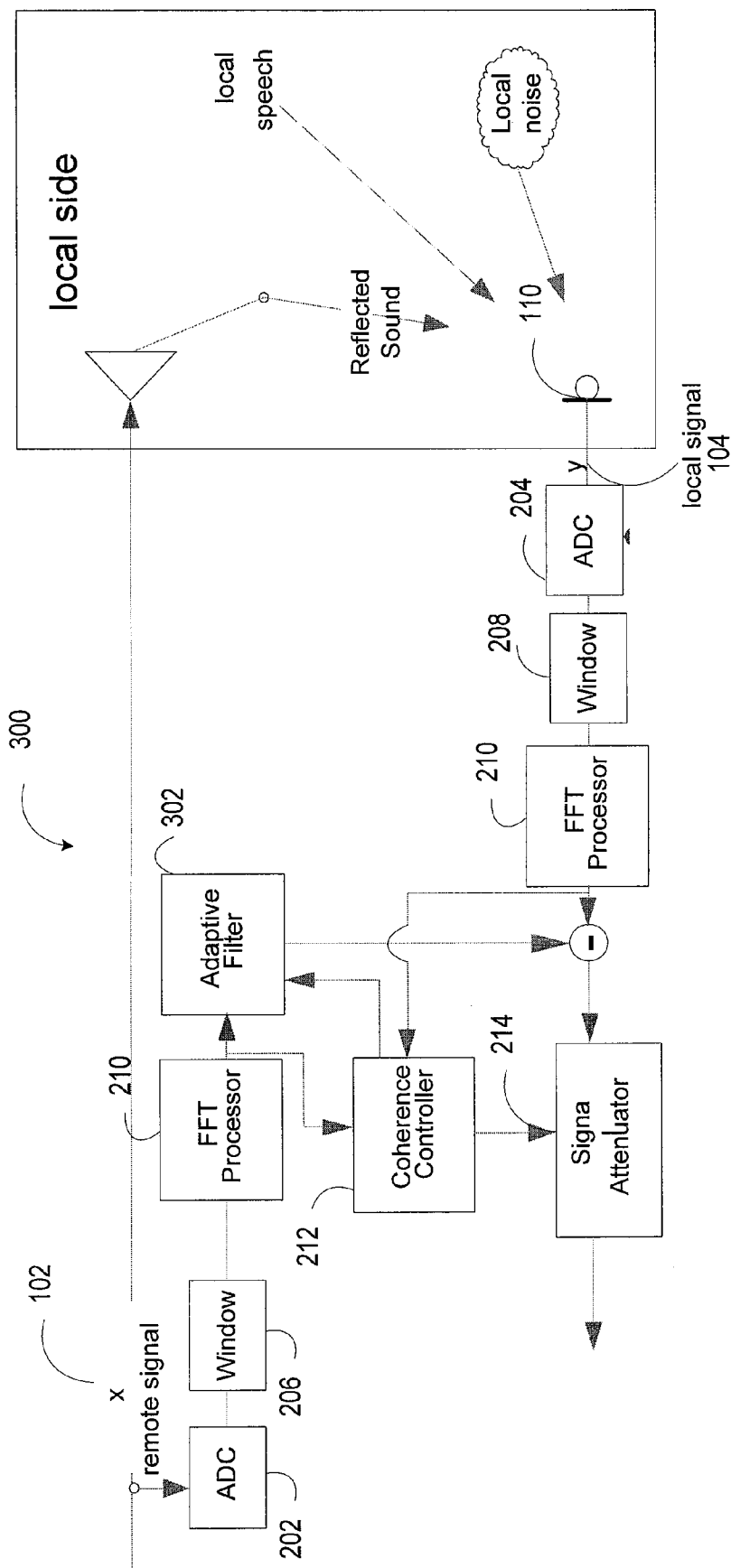
FIG. 3 is a block diagram of a third alternative speech enhancement system.

FIG. 3 is an alternative speech enhancement system 300 that also improves the perceptual quality of a processed speech signal. The alternative system 300 may include one, two, three, or more cascading filters that modify their response(s) until a reflected signal is modeled or extracted. In some alternative systems, the filter(s) predict the reflected signal from the remote signal 102. These predicted signals may then be removed or dampened through an attenuator, a subtractor, a controller, or other hardware that may minimize the interference of a reflected signal.

In FIG. 3, the coefficients of an adaptive filter 302 are updated when the relative magnitude and phase difference between the corresponding frequency bins of the remote signal 102 and local signal 104 are approximately the same or constant. In some systems, the coherence controller 212 accounts or compensates for environmental noise differences when directing the adaptive filter 302 to adjust its coefficients or tap weights and the signal attenuator 214 to attenuate the reflected signal. For example, in noisy conditions, the coherence may be lower than in quiet conditions. The coherence values can be normalized (e.g., divided by their long term average through a divider circuit or processor) such that a "best" coherence produces a value near 1.0. The adaptive filter adjustment may minimize the error e(n) between the filtered output and the local signal (y). If the relative magnitude and phase differences between the corresponding frequency bins of the remote signal 102 and local signal 104 are constantly changing, the coherence controller 212 may inhibit or prevent the adaptive filter 302 from adjusting its coefficients or tap weights. In some alternative systems, the coherence controller 212 may direct the adaptive filter 302 not to generate an output when a low coherence is detected.

Because of the time variant nature of a reflected signal such as an echo, the rate at which the adaptive filter 302 learns may depend on the level of coherence detected by the coherence controller 212. If the coherence controller 212 detects a high coherence (e.g., a coherence that may lie within a range having an upper limit near 1) the adaptive filter 302 may adjust its coefficients or tap weights quickly. A high coherence may indicate that there may be a high probability that only the remote speaker is talking, and thus the adaptive filter 302 may extract the remote speaker's signal while minimizing signal interference from a local source. When a high coherence is not detected, the adaptive filter 302 may adjust its coefficients or tap weights slowly or almost not at all. A low or middle coherence value may indicate that there is a low probability that only the remote speaker is talking. In some alternative systems, a low or middle coherence value may not yield an adaptive filter output. In these alternative systems, the local signal 104 will pass to an interface with little or substantially no attenuation.

The speech enhancement systems may reduce the computational and memory requirements of some echo cancellation systems, because the adaptation rate may be based on a single parameter, a coherence value, instead of multiple measurements or parameters. In some systems, longer reflected signals may be processed without requiring significant memory resources. A reflected signal length or echo length may be modeled by the length of time over which coherence is measured, a smoothing of a reference signal by weighting logic, a smoothing of the attenuation function applied by an attenuator or programmed processor, and/or a smoothing of the coherence measure detected by a coherence processor, or a combination of the hardware. The speech enhancement systems minimize some of the interference heard in large rooms and enables echo cancellation without the processing and memory requirements of larger devices. The speech enhancement systems may be time-series based (e.g., exclusively) in some systems and frequency based in some other systems or a combination in other systems.

Figure 4:
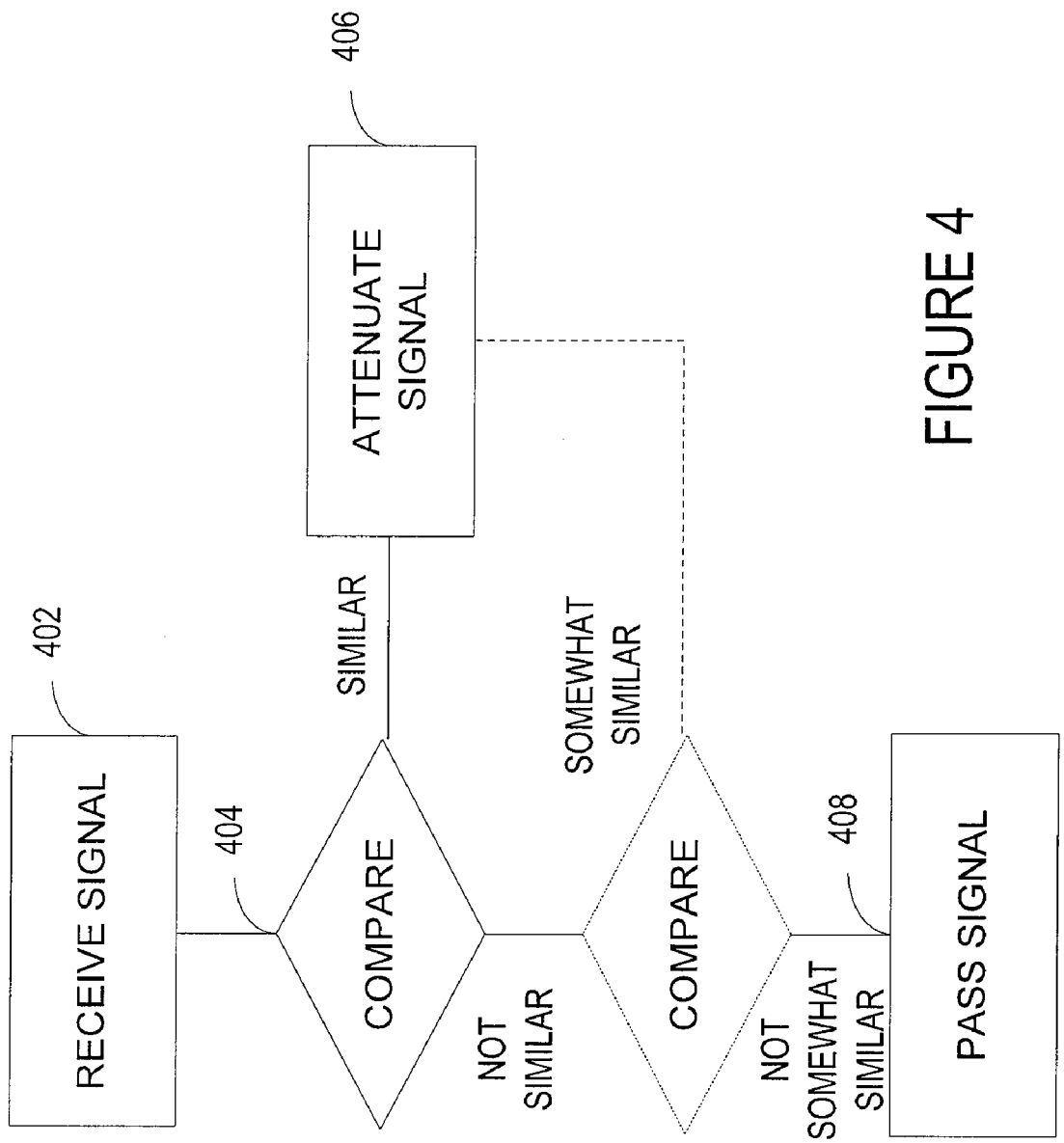
FIG. 4 is a flow diagram of a speech enhancement process.

FIG. 4 is a flow diagram of a speech enhancement process that removes some or nearly all of a reflected signal which enhances the perceptual quality of the processed signal. At 402 a remote time-varying signal is received. In some processes the signals are received through an audio bus and interface that conveys multiple audio signals from multiple audio sources. To assure a high quality speech signal, the similarities and/or differences between the remote time-varying signal and a local time-varying signal are detected at 404.

When portions of the remote signal and local signal are similar, a reflected speech signal or echo is minimized or dampened at 406. When portions of the remote signal and the local signal are not similar, the local signal is passed to an interface at 408. When the remote signal and local signal are somewhat similar, a reflected speech signal or echo may be minimized or dampened as shown by the optional path. In an alternative method, the local signal is passed to an interface when the remote signal and the local signal are somewhat similar. The coherence-based methods may be time-series based or frequency based. A time series based process may be used in systems having access to limited memory. A frequency based process may be used in systems having access to more memory.

Figure 5:
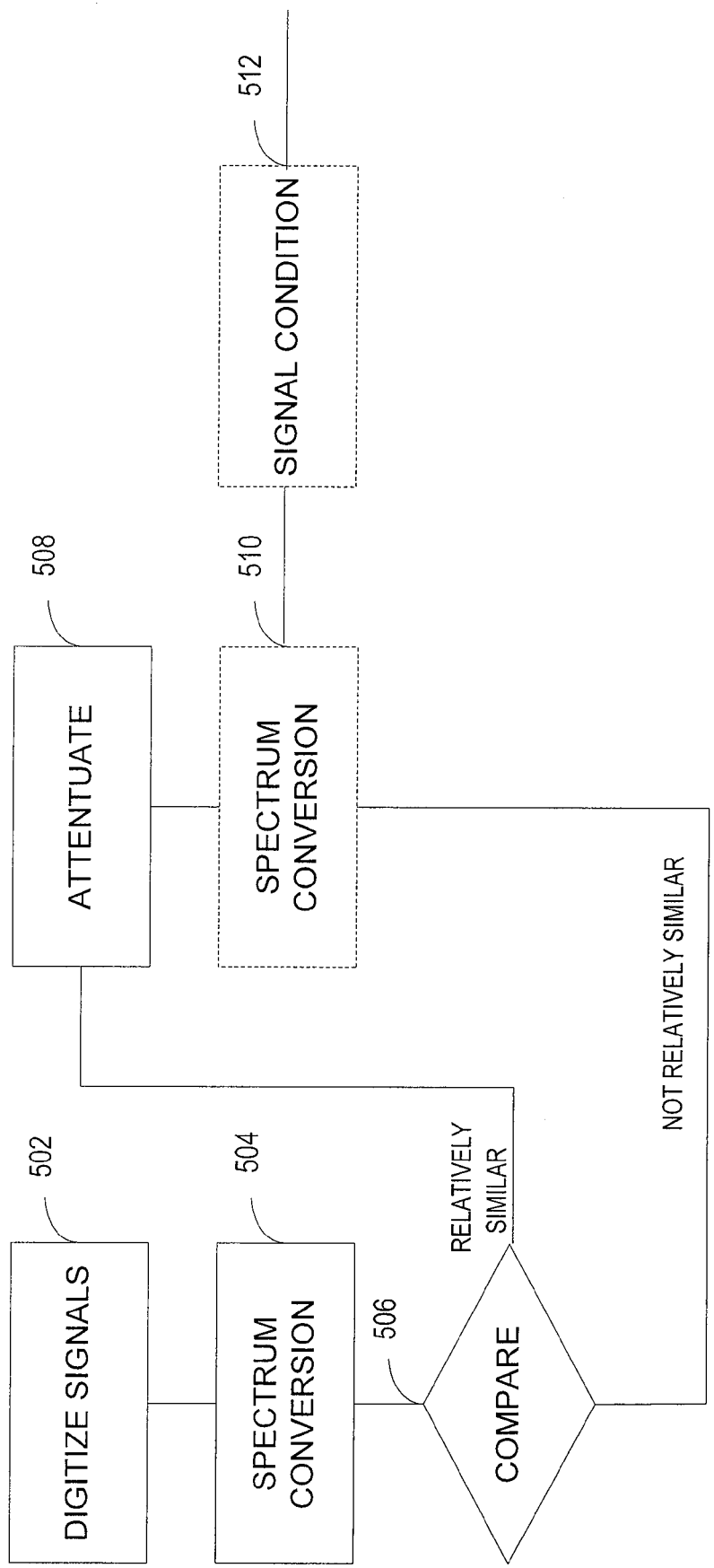
FIG. 5 is a flow diagram of a second alternative speech enhancement process.

FIG. 5 is an alternative flow diagram of a speech enhancement. At 502 a received or detected remote and local signal is digitized at a predetermined frequency. To assure a good quality voice, the signals may be converted to a PCM signal by an analog-to-digital converter. At 504 a complex spectrum for the windowed signals may be obtained through an FFT or filtering process that separates the digitized signals into frequency bins, with each bin identifying a magnitude and a phase across a frequency range.

At 506 the relative magnitude and phase differences between the remote input signal and local input signal are compared for some or each of the corresponding frequency bins to estimate multiple coherence values. When the relative magnitude and phase differences of the corresponding frequency bins of the remote signal and local signal are approximately the same or constant, a reflected signal received from a local source is dampened or attenuated at 508. When the relative magnitude and phase differences of the corresponding frequency bins of the remote speech input signal and local input speech signal are constantly changing, the local signal is passed. When the comparison does not show a similar or constant difference or shows that the signals are constantly changing, some processes pass the local signal, and alternative processes partially attenuate the local signal to attain a desired perceptual quality. In some processes the processed signal may be converted to a time-series signal (e.g. by an optional inverse FFT process and an overlap and add process).

Figure 6:
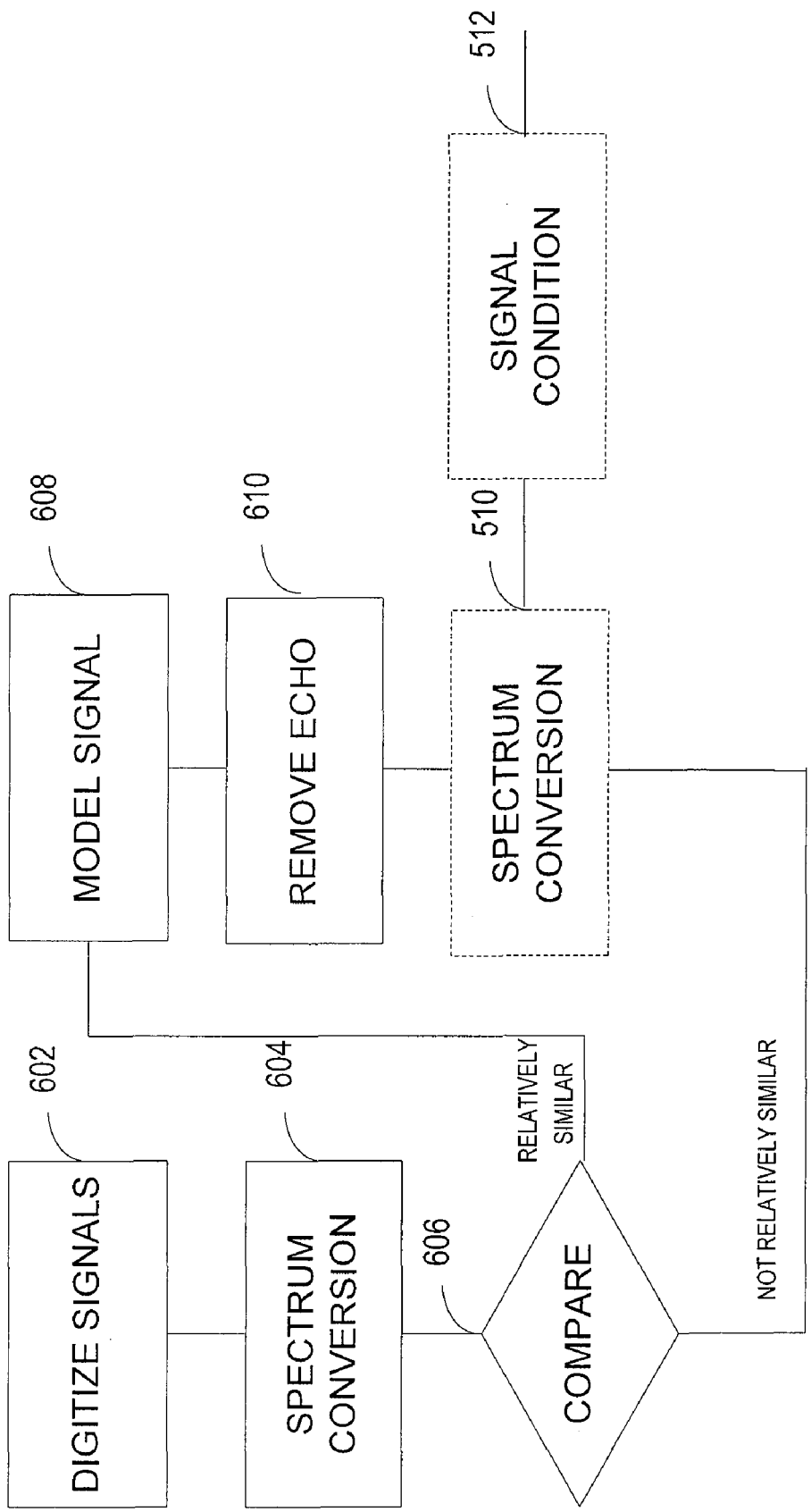
FIG. 6 is a flow diagram of a fourth alternative speech enhancement process.

FIG. 6 is a flow diagram of a process that extracts or models a reflected signal based on coherence between the remote signal and local signal. The remote and local signals are received and digitized at a predetermined frequency at 602. A complex spectrum for the windowed signals are obtained that separates the digitized signals into frequency bins, with each bin identifying a magnitude and a phase across a small frequency range at 604.

At 606, the complex spectrums of the remote and local signals are compared. When the relative magnitude and phase difference between the corresponding frequency bins of the remote signal and local signal are approximately the same or constant, a reflected signal is modeled and then extracted from the local signal. When the relative magnitude and phase differences between the corresponding frequency bins of the remote signal and local signal are constantly changing or are not substantially constant, a reflected signal is not generated or modeled.

In an alternative process, a reflected signal is modeled or generated when the relative magnitude and phase differences between the corresponding frequency bins of the remote input speech signal and local input speech signal are not constantly changing. If the reflected signal is modeled or generated, the process substantially removes or dampens the reflected signal at 710. The signal may then be converted to the time domain at optional 510 and conditioned at optional 512.

The method shown or described with respect to FIG. 4-7 may be encoded in a signal bearing medium, a computer readable medium such as a memory, programmed within a device such as one or more integrated circuits, or processed by a controller or a computer. If the methods are performed by software, the software may reside in a memory resident to or interfaced to a signal detector, signal attenuator, a communication interface, or other device having non-volatile or volatile memory interfaced or resident to the speech enhancement system. The memory may include an ordered listing of executable instructions for implementing logical functions. A logical function may be implemented through digital circuitry, through source code, through analog circuitry, or through an analog source such through an analog electrical, audio, or video signal. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine-readable medium," "propagated-signal" medium, and/or "signal-bearing medium" may comprise any means that contains, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM" (electronic), a Read-Only Memory "ROM" (electronic), an Erasable Programmable Read-Only Memory (EPROM or flash memory) (electronic), or an optical fiber (optical). A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

Figure 7:
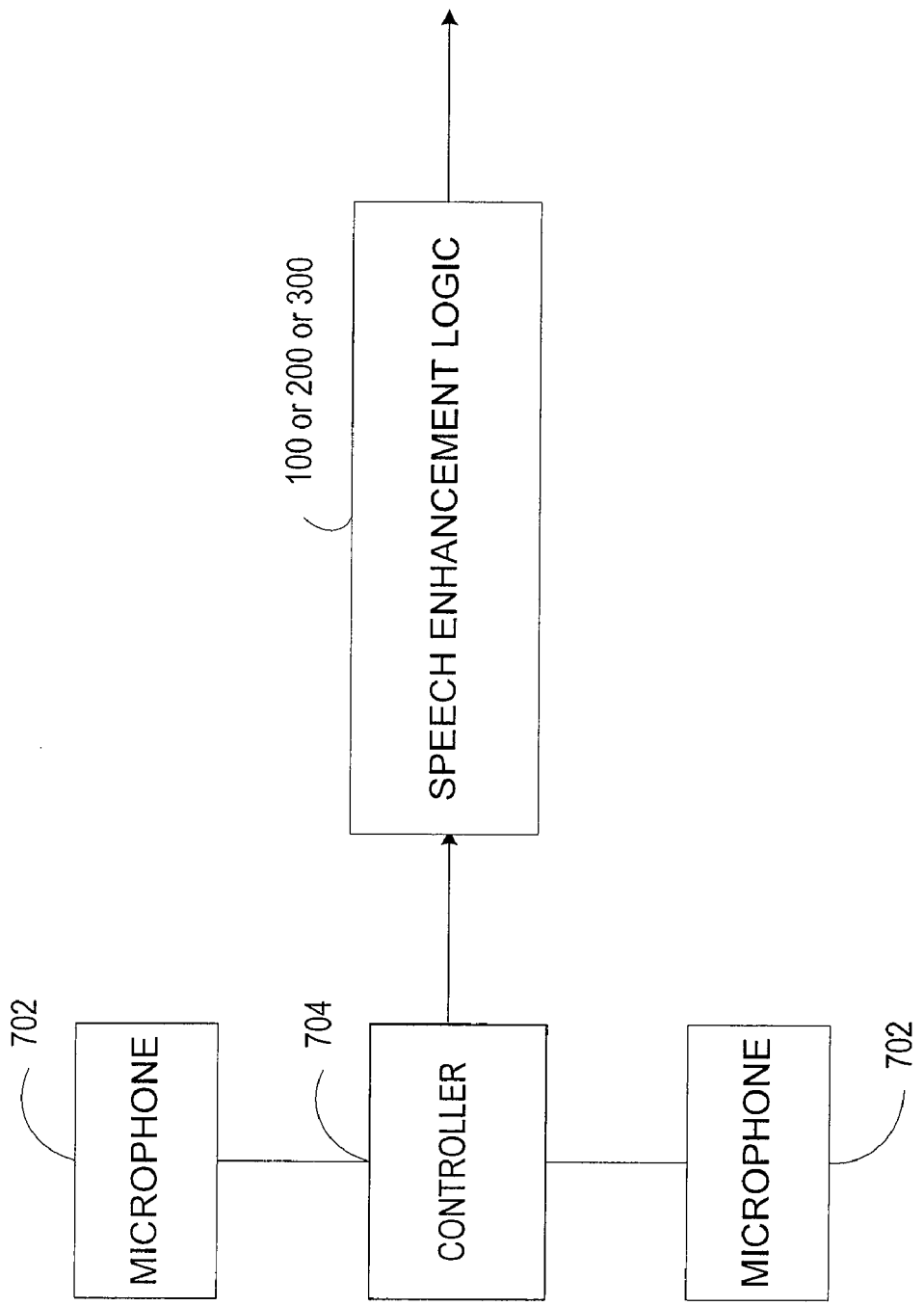
FIG. 7 is a partial block diagram of an alternative interface that may receive a local and/or remote signal of FIG. 1, 2, or 3.

The above-described systems may condition signals received from one, two, three, or more microphones or signal detectors. Many combinations of processes or systems may be used to identify and attenuate reflected signals or echoes. Besides monitoring the relative magnitude and phase differences between signals, an alternative system may monitor only the relative phase differences between a remote and a local signal at different frequencies. If the relative phase is substantially constant (with some random phase component to account for local or background noise) a reflected signal is detected and may be extracted, modeled, and substantially removed. If the relative phase is constantly shifting, a reflected signal may not be extracted or modeled. Another alternative may compare signals detected from two, three, or more microphones that may be selected by a controller (two are shown in FIG. 7) before detecting, modeling, and extracting a reflected signal or echo. The controller 704 may make a selection based on the relative energy each microphone 702 detects, the level of background noise each microphone 702 detects, or other detectable parameters or combinations.

Other alternative speech enhancement systems include combinations of the structure and functions described above or illustrated within the figures. The speech enhancement systems of FIGS. 1-3 may further include spectrum conversion logic. Some spectrum conversion logic includes an inverse FTT processor in communication with an overlap and add controller. The logic may be implemented in software or hardware. The term "logic" is intended to broadly encompass a hardware device or circuit, software, or a combination. The hardware may include a processor or a controller including or having access to volatile and/or non-volatile memory and may also include interfaces between devices through wireless and/or hardwire mediums or connections. The wireless interfaces may utilize Zigbee, Wi-Fi, WiMax, Mobile-Fi, Ultrawideband, Bluetooth, cellular and any other wireless technologies or combination.

Figure 8:
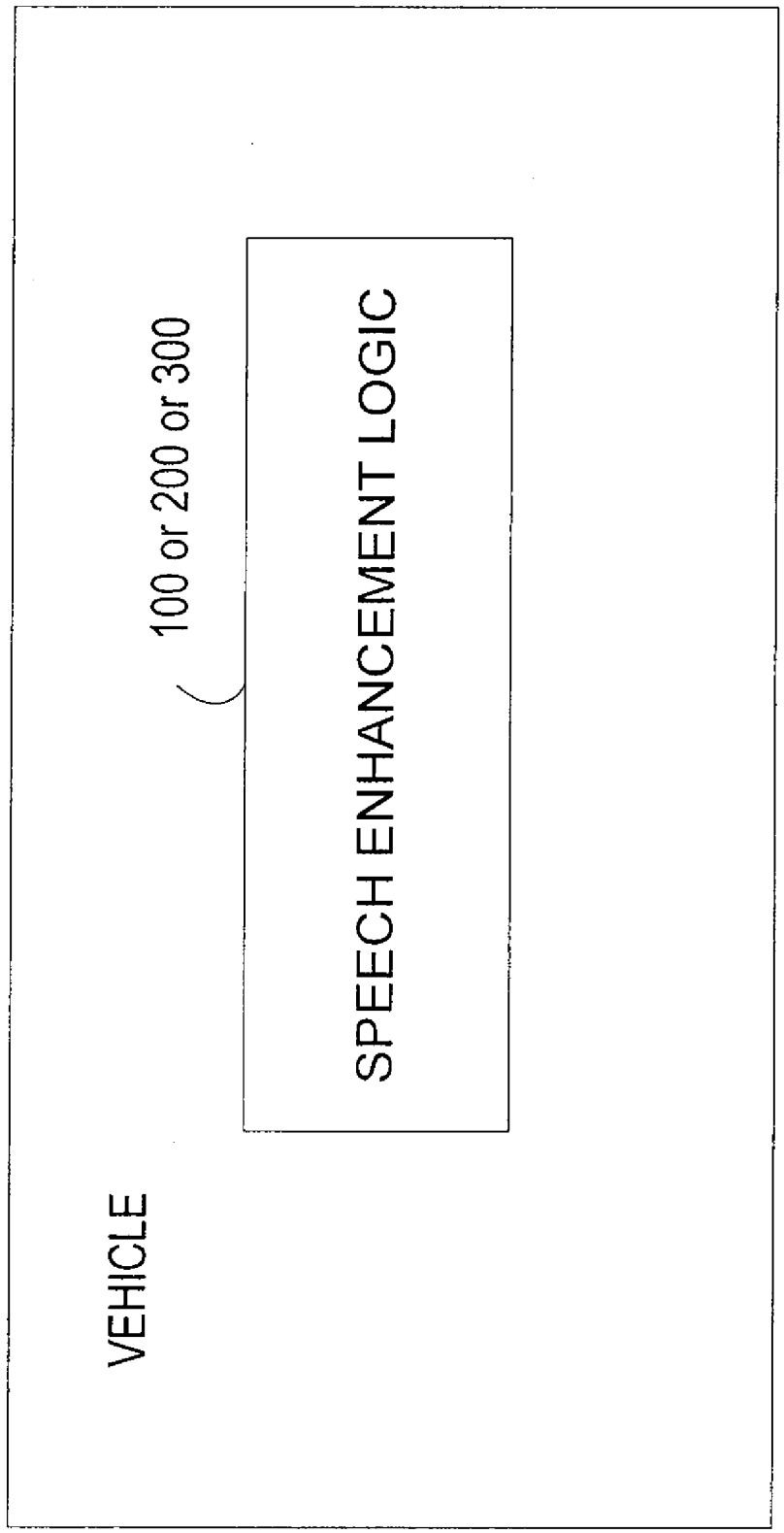
FIG. 8 is a block diagram of speech enhancement logic within a vehicle.
Figure 9:
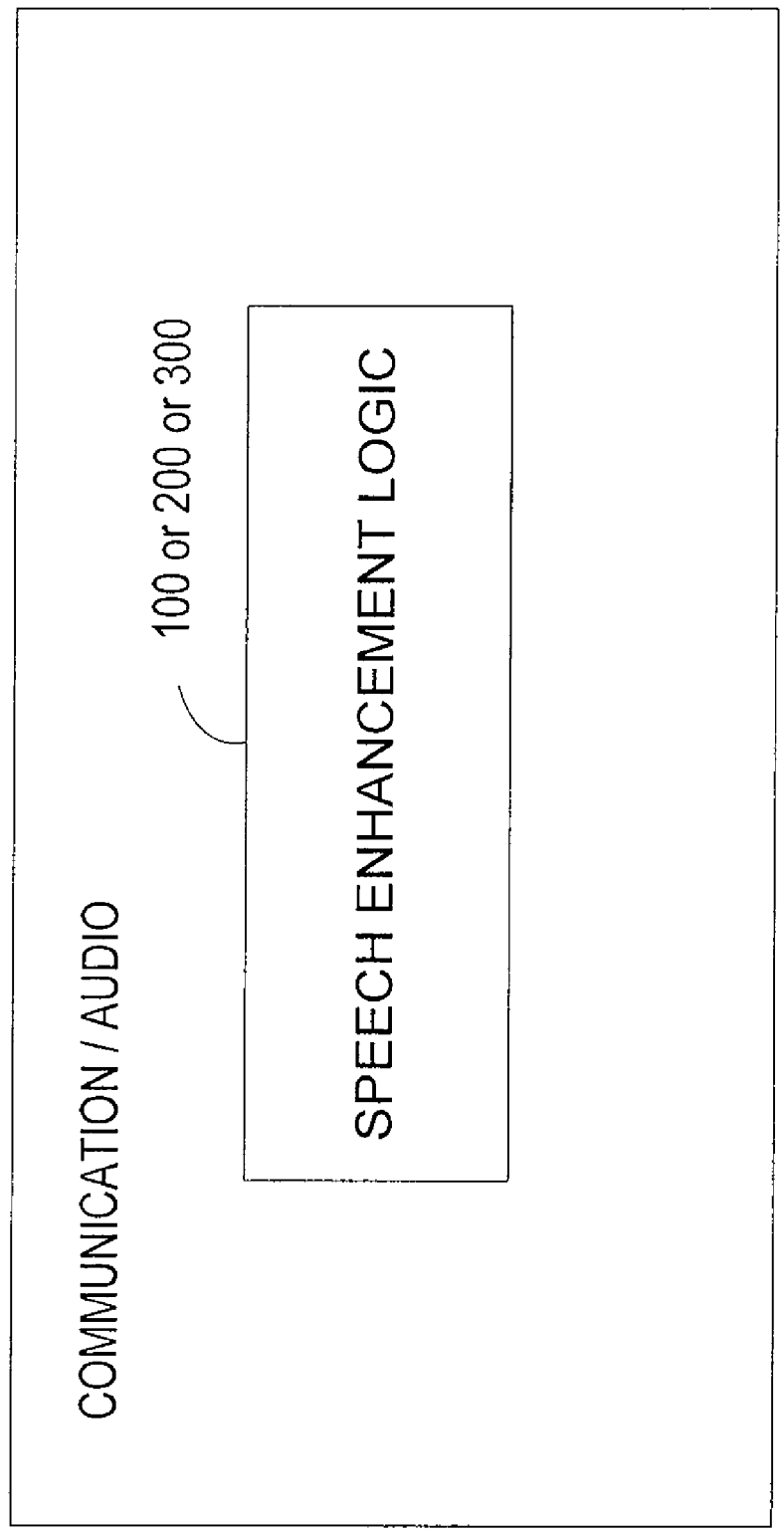
FIG. 9 is a block diagram of speech enhancement logic within a communication or an audio device.
Figure 10:
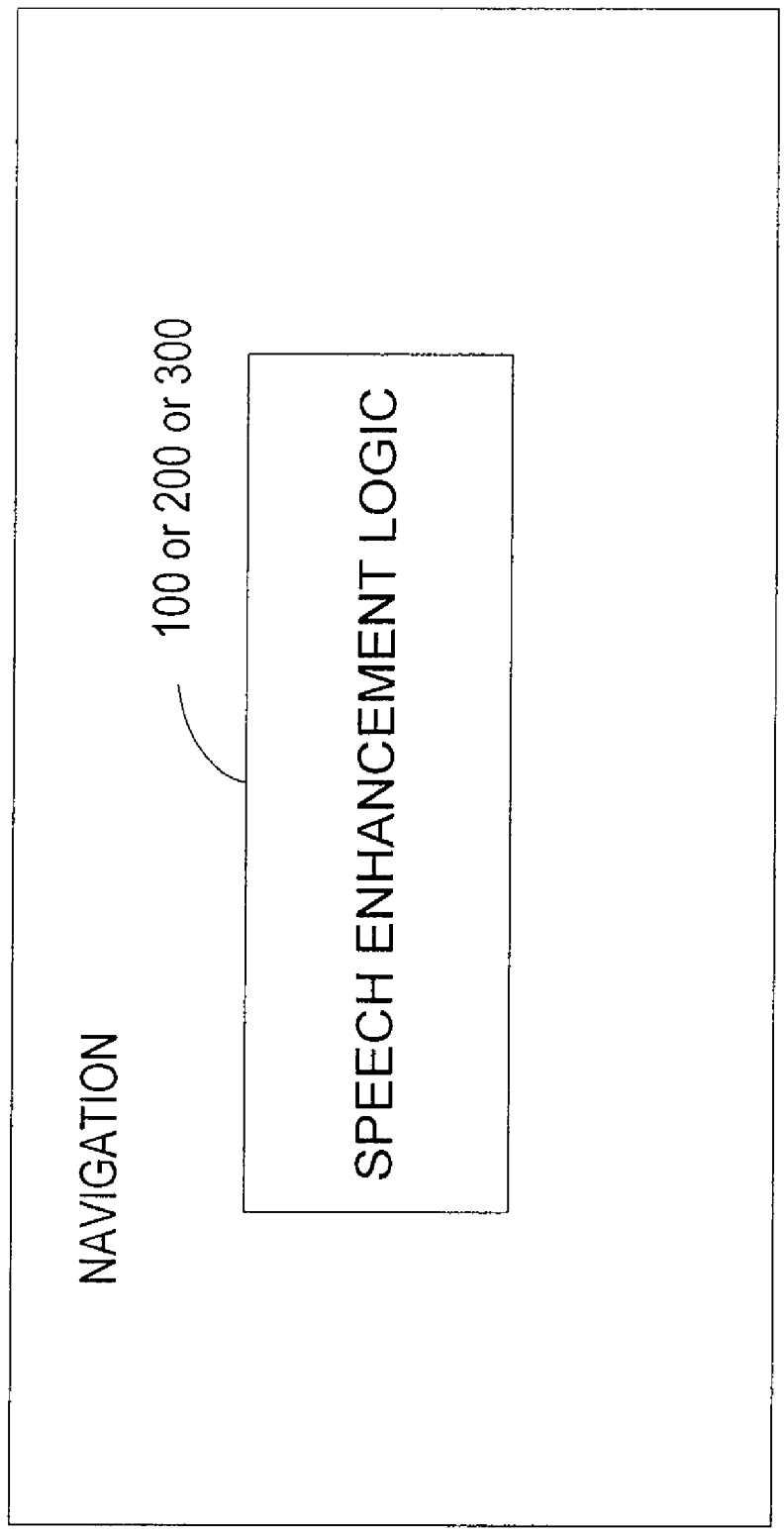
FIG. 10 is a block diagram of speech enhancement logic within a navigation system.

The speech enhancement system is easily adaptable to any technology or devices. Some systems or components interface or couple devices or structures for transporting people or things such as the vehicle shown in FIG. 8. Some speech enhancement systems or components interface or couple instruments that convert voice and other sounds into a form that may be transmitted to remote locations, such as landline and wireless devices, audio equipment as shown in FIG. 9, navigation equipment as shown in FIG. 10, or other communication systems that may be susceptible to echoes or reflected sound.

The speech enhancement system improves the perceptual quality of a processed voice. The logic may automatically learn and encode the shape and form of the sound associated with the reflected sound in a real or a delayed time. By tracking coherence, the logic may eliminate, dampen, or reduce reflected sound using a memory that temporarily or permanently stores the similar attributes of the reflected sound. Some systems track a relative magnitude and phase between multiple signals. The systems may eliminate or dampen a reflected signal through time-varying gain components that directly condition a signal.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A speech enhancement system that improves the perceptual quality of an aural signal comprising:
 a receiver that detects and receives unvoiced signals, fully voiced signals, and mixed voice remote signals;
 a coherence processor that identifies the similarities between a local signal and a remote signal of the remote signals, where the coherence processor tracks a relative phase difference between the local signal and the remote signal, and issues a command based on the relative phase difference between the local signal and the remote signal; and
 a cancellation processor responsive to the command received from the coherence processor to dampen a reflected signal that comprises part of the local signal.

2. The speech enhancement system of claim 1 where the speech enhancement system dampens the reflected signal through time-varying gain elements.

3. The speech enhancement system of claim 1 where the coherence processor comprises a coherence controller in communication with a Fast Fourier Transform processor.

4. The speech enhancement system of claim 3 further comprising an analog-to-digital device in communication with a windowing device that provides signal estimates of the magnitudes and phases of the local signal and the remote signals, respectively.

5. The speech enhancement system of claim 4 where the cancellation processor comprises a signal attenuator in communication with an inverse Fast Fourier Transform processor.

6. The speech enhancement system of claim 5 further comprising an overlap and add controller in communication with the Fast Fourier Transform processor that conditions a time-series signal.

7. The speech enhancement system of claim 1 where the coherence processor calculates a phase value of the remote signal, calculates a phase value of the local signal, and calculates a coherence value based on one or more similarities between the phase value of the remote signal and the phase value of the local signal.

8. The speech enhancement system of claim 7 where the cancellation processor dampens the reflected signal in the local signal by an amount based on the coherence value, and where the reflected signal comprises a portion of the local signal that originated from content of the remote signals.

9. A speech enhancement system that improves the perceptual quality of an aural signal comprising:
 a receiver that detects and receives unvoiced signals, fully voiced signals, and mixed voice remote signals;
 a coherence controller that identifies similarities between a local signal and a remote signal of the remote signals, where the coherence controller tracks a relative phase difference between the local signal and the remote signal, and calculates a coherence value based on the relative phase difference between the local signal and the remote signal;
 an environmental noise compensator that normalizes the coherence value such that a coherence between the local signal and the remote signals results in the coherence value being near 1.0;
 an adaptive filter that models a reflected signal from the remote signals based on a coherence between the local signal and the remote signals; and
 a signal attenuator responsive to a command received from the coherence controller to dampen a reflected signal that comprises part of the local signal.

10. The speech enhancement system of claim 9 further comprising a Fast Fourier Transform processor in communication with the receiver and the coherence controller.

11. The speech enhancement system of claim 10 further comprising a plurality of analog-to-digital devices, each in communication with at least one of a plurality of windowing devices that provide signal estimates of the magnitudes and phases of the local signal and remote signal, respectively.

12. The speech enhancement system of claim 10 where the signal attenuator is in communication with an inverse Fast Fourier Transform processor.

13. The speech enhancement system of claim 12 further comprising an overlap and add controller in communication with the Fast Fourier Transform processor that conditions a time-series signal.

14. The speech enhancement system of claim 12 where the adaptive filter comprises a plurality of cascading filters.

15. The speech enhancement system of claim 12 where the adaptive filter adjusts a plurality of coefficients based only on the coherence value.

16. A speech enhancement system that improves the perceptual quality of an aural signal comprising:
 a receiver that detects and receives unvoiced signals, fully voiced signals, and mixed voice remote signals;
 a plurality of analog-to-digital devices that digitize local signals and the remote signals;

means that identify similarities between the local signals and the remote signals, and that calculate a coherence value based on the similarities;

means that compensate for environmental noise by normalizing the coherence value through a divider circuit that divides by a long term average;

adaptive filters that model reflected signals from the remote signals based on coherences between the local signals and the remote signals;

a signal attenuator responsive to a command received from the means that identify similarities to dampen reflected signals that comprise one or more parts of the local signals;

an Inverse Fast Fourier Transform processor that converts an output of the signal attenuator into the time domain; and an overlap and add controller in communication with the Inverse Fast Fourier Transform processor.

17. The speech enhancement system of claim 16, where the means that identify similarities comprise a coherence processor that tracks a relative phase difference between a local signal of the local signals and a remote signal of the remote signals, and where the coherence processor calculates the coherence value based on the relative phase difference between the local signal and the remote signal.

18. A method that improves the perceptual quality of an aural signal comprising:

detecting unvoiced signals, fully voiced signals, and mixed voice remote signals;

identifying, by a coherence processor, similarities or differences between a local signal and a remote signal of the remote signals by tracking a relative phase difference between the local signal and the remote signal;

issuing an attenuation command or a pass command based on the relative phase difference between the local signal and the remote signal; and dampening reflected signals from the local signal by a higher amount when the attenuation command is issued for the local signal than when the pass command is issued for the local signal.

19. A method that improves the perceptual quality of an aural signal comprising:

detecting an unvoiced signal, a fully voiced signal, or a mixed voice remote signal;

digitizing the detected remote signal and a local signal;

converting a spectrum of the remote signal and a spectrum of the local signal from a first domain to a second domain;

tracking a relative phase difference between the local signal and the remote signal;

issuing an attenuation command or a pass command based on the relative phase difference between the local signal and the remote signal; and dampening reflected signals from the local signal by a higher amount when the attenuation command is issued for the local signal than when the pass command is issued for the local signal.

20. The method of claim 19 further comprising dampening reflected signals from the local signal when a relatively low coherence is not detected.

21. The method of claim 19 further comprising selecting the remote signals from a plurality of microphones.

22. The method of claim 19 further comprising modeling the reflected signal when similarities between the remote signal and the local signal are detected.

23. The method of claim 19 further comprising converting the local signal from a first signal domain to a second signal domain.

24. A method, comprising:

receiving a remote signal;

receiving a local signal;

calculating a phase value and a magnitude value of the remote signal;

calculating a phase value and a magnitude value of the local signal;

comparing the phase value and the magnitude value of the remote signal with the phase value and the magnitude value of the local signal;

calculating a coherence value, by a coherence processor, based on one or more similarities between the phase value and the magnitude value of the remote signal and the phase value and the magnitude value of the local signal;

calculating an attenuation amount based on the coherence value; and attenuating a reflected signal in the local signal by applying the attenuation amount to the local signal, where the reflected signal comprises a portion of the local signal that originated from content of the remote signal.

25. The method of claim 24, where the act of calculating the coherence value comprises setting the coherence value to a higher level when the remote signal and the local signal are relatively similar than when the remote signal and the local signal are relatively dissimilar; and where the act of calculating the attenuation amount comprises setting the attenuation amount to a higher level when the coherence value is relatively high than when the coherence value is relatively low.

* * * * *